US010769203B1

(12) United States Patent
Sonasath et al.

(10) Patent No.: US 10,769,203 B1
(45) Date of Patent: Sep. 8, 2020

(54) SYSTEM AND METHOD FOR PREDICTION AND RECOMMENDATION USING COLLABORATIVE FILTERING

(71) Applicant: Samsung Electronics Co., Ltd., Suwon-si, Gyeonggi-do (KR)

(72) Inventors: Moiz Kaizar Sonasath, Sunnyvale, CA (US); Vinod Cherian Joseph, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/709,705

(22) Filed: Dec. 10, 2019

Related U.S. Application Data

(60) Provisional application No. 62/916,693, filed on Oct. 17, 2019.

(51) Int. Cl.
G06F 16/65 (2019.01)
G06F 16/635 (2019.01)
H04N 21/439 (2011.01)
G06F 16/64 (2019.01)
G06F 16/901 (2019.01)
G06F 16/638 (2019.01)

(52) U.S. Cl.
CPC ............ G06F 16/65 (2019.01); G06F 16/635 (2019.01); G06F 16/638 (2019.01); G06F 16/64 (2019.01); G06F 16/9024 (2019.01); H04N 21/4394 (2013.01)

(58) Field of Classification Search
CPC ........ G06F 16/65; G06F 16/638; G06F 16/64; G06F 16/635; G06F 16/9024; H04N 21/4394
See application file for complete search history.

(56) References Cited

U.S. PATENT DOCUMENTS

| 2012/0224711 A1* | 9/2012 | Kim ........................ H04W 4/21 381/77 |
| 2012/0290434 A1* | 11/2012 | Moritz ............... G06Q 30/0261 705/26.7 |
| 2013/0038756 A1* | 2/2013 | Cheng .............. H04N 21/44213 348/231.99 |
| 2014/0068654 A1 | 3/2014 | Marlow et al. |

(Continued)

FOREIGN PATENT DOCUMENTS

KR 10-2019-0024333 A 3/2019
KR 10-2019-0088128 A 7/2019

Primary Examiner — Fan S Tsang
Assistant Examiner — David Siegel

(57) ABSTRACT

A method includes obtaining acoustic event information from at least one device, the acoustic event information associated with a first activity, at least a portion of the acoustic event information associated with sounds originating from a plurality of individuals in an identified group during a time period of the first activity. The method also includes categorizing the acoustic event information into a plurality of sound classes. The method also includes performing collaborative filtering on the plurality of sound classes. The method also includes determining one or more interests of the plurality of individuals in the identified group based on results of the collaborative filtering. The method also includes recommending a common activity for the identified group, based in part on the one or more interests of the plurality of individuals in the identified group.

20 Claims, 11 Drawing Sheets

(56) References Cited

U.S. PATENT DOCUMENTS

2014/0372401 A1* 12/2014 Goldstein ............... G10L 25/54
                                                                                   707/706
2016/0037195 A1    2/2016 Shin et al.
2017/0185669 A1    6/2017 Chang et al.

* cited by examiner

SYSTEM AND METHOD FOR PREDICTION AND RECOMMENDATION USING COLLABORATIVE FILTERING

CROSS-REFERENCE TO RELATED APPLICATION AND PRIORITY CLAIM

This application claims priority under 35 U.S.C. § 119(e) to U.S. Provisional Patent Application No. 62/916,693 filed on Oct. 17, 2019, which is hereby incorporated by reference in its entirety.

TECHNICAL FIELD

This disclosure relates generally to acoustic detection and analysis. More specifically, this disclosure relates to a system and method for prediction and recommendation of events and activities using collaborative filtering.

BACKGROUND

In current society, it can be difficult for people to be able to spend quality time with their loved ones. Busy consumers want personalized recommendations for creative ways to spend more time with their family and friends, and for creating memorable family experiences. They would like support to plan, create and manage unique experiences for family members with given limited time, effort, and resources.

Day to day family conversations provide important acoustic context of what a family likes to do and opportune times for recommendations. However, in most conventional activity and acoustic event detection solutions, it is often cumbersome or inaccurate to relate a non-configured event without prior labels and tags. For example, many methods use Hidden Markov Models (HMM) and Nonnegative Matrix Factorization (NMF) approaches for detecting sound events, which can be very unreliable. Additionally, while some scene independent systems attempt to use a deep learning model applicable across different home scenarios in different user environments, such deep learning models are based on feed forward networks, which lack time and frequency variance. Moreover, temporal context is limited to the short time window of the spectrogram.

SUMMARY

This disclosure provides a system and method for prediction and recommendation of events and activities using collaborative filtering.

In a first embodiment, a method includes obtaining acoustic event information from at least one device, the acoustic event information associated with a first activity, at least a portion of the acoustic event information associated with sounds originating from a plurality of individuals in an identified group during a time period of the first activity. The method also includes categorizing the acoustic event information into a plurality of sound classes. The method also includes performing collaborative filtering on the plurality of sound classes. The method also includes determining one or more interests of the plurality of individuals in the identified group based on results of the collaborative filtering. The method also includes recommending a common activity for the identified group, based in part on the one or more interests of the plurality of individuals in the identified group.

In a second embodiment, an electronic device includes a transceiver and a processor. The processor is configured to obtain, via the transceiver, acoustic event information from at least one other device, the acoustic event information associated with a first activity, at least a portion of the acoustic event information associated with sounds originating from a plurality of individuals in an identified group during a time period of the first activity. The processor is also configured to categorize the acoustic event information into a plurality of sound classes. The processor is also configured to perform collaborative filtering on the plurality of sound classes. The processor is also configured to determine one or more interests of the plurality of individuals in the identified group based on results of the collaborative filtering. The processor is also configured to recommend a common activity for the identified group, based in part on the one or more interests of the plurality of individuals in the identified group.

In a third embodiment, a non-transitory computer readable medium contains computer readable program code that, when executed, causes at least one processor to obtain acoustic event information from at least one device, the acoustic event information associated with a first activity, at least a portion of the acoustic event information associated with sounds originating from a plurality of individuals in an identified group during a time period of the first activity; categorize the acoustic event information into a plurality of sound classes; perform collaborative filtering on the plurality of sound classes; determine one or more interests of the plurality of individuals in the identified group based on results of the collaborative filtering; and recommend a common activity for the identified group, based in part on the one or more interests of the plurality of individuals in the identified group.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart speaker and a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
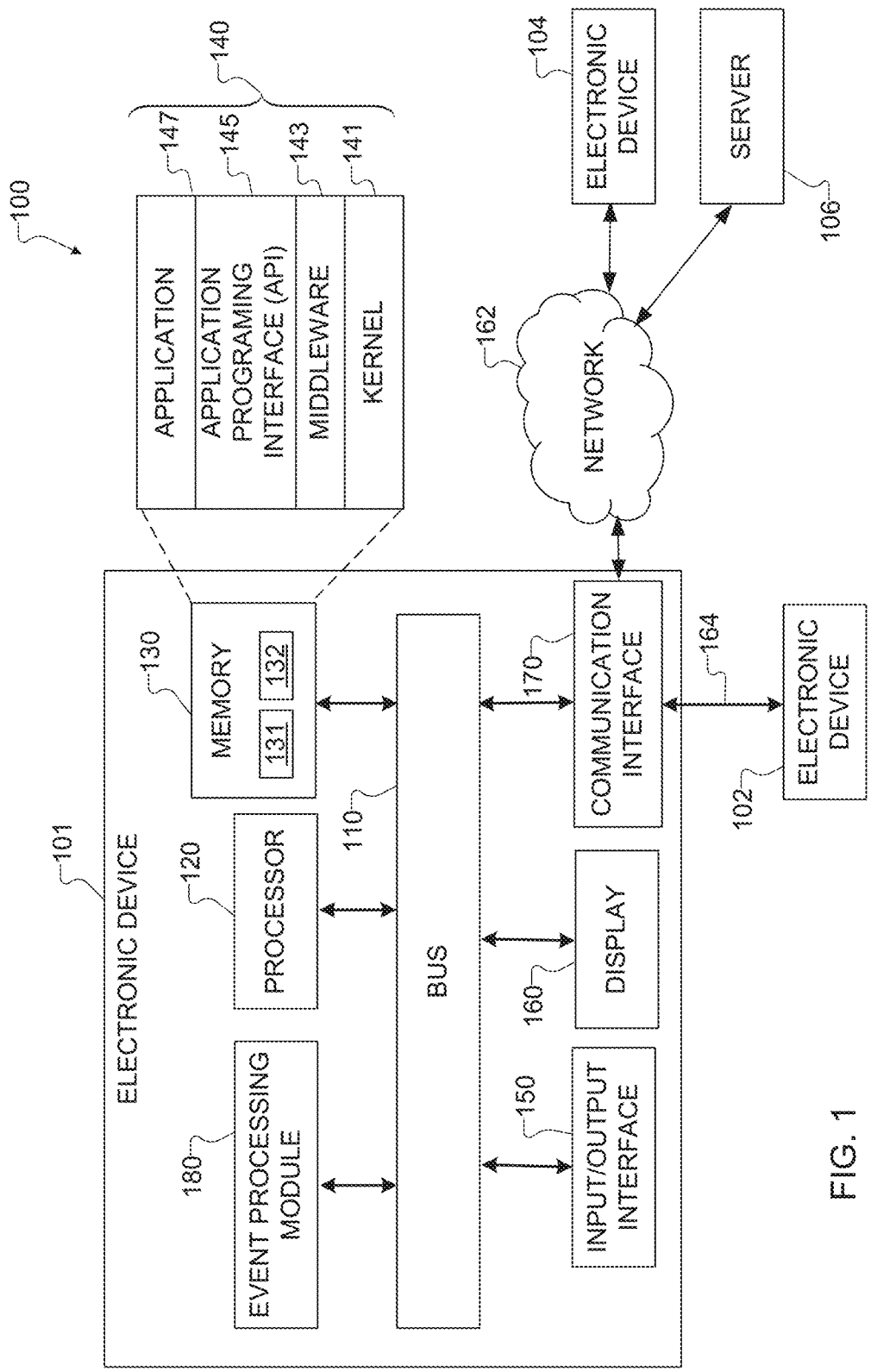
FIG. 1 illustrates an example network configuration in accordance with this disclosure.

The figures discussed below and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference numerals may be used to refer to the same or similar elements throughout the specification and the drawings.

As noted above, people want personalized recommendations for creative ways to spend more time with their family and friends, and for creating memorable family experiences. However, conventional methods for providing recommendations are inadequate. For example, some conventional neural network methods work only with static sources with pre-defined training data and tags, along with input features using spectrum or generalized cross correlation (GCC) based data for temporal diversity. In most neural network event activity recommendation applications, it is often cumbersome to interact with phase spectrograms and localization data in the input without knowledge of the contextual class for reference. Additionally, for scene-independent, activity-based acoustic event detection on another device, conventional applications require the model to have some learning of the transferred feature layers.

To address these and other issues, this disclosure provides systems and methods for prediction and recommendation of personal and group activities using collaborative filtering. In some embodiments, a system can detect interest in (or relevance of) activities across different members in the home from polyphonic sounds (i.e., sounds originating from more than one source) detected in the home and based on acoustic patterns in the home. The system can analyze polyphonic sounds with convolutional neural networks (CNNs) to learn relevant features and build high-level sound class representation related to the current engaged activity or event context derived from automatic content recognition (ACR) and natural language processing (NLP). In some embodiments, the system can leverage collaborative filtering to predict feature classes and interests. As used herein, collaborative filtering refers to the process of filtering information from multiple data sources to detect patterns associated with one or more users, and then use the patterns to make predictions about the interests of the users. The system can apply a hybrid neural network to represent frame-level sound features for representation and estimate the probabilities of the sound event classes towards classification. The leveraging of event activity data correlation can overcome cold start concerns.

Unlike conventional sound detection systems (which are activated only in the event of a command or other user input and generally detect only verbal sounds and listen only for a few seconds), the disclosed system can passively detect both verbal and non-verbal sounds over a longer period of time (e.g., minutes, hours, or days) and learn contexts and sound classes based on the longer period of detection. The disclosed system can determine interests of individuals based on the sound classes, and recommend a common activity for the individuals. In some embodiments, the system can also assist in making plans associated with the recommended activity.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or nonvolatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101—mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

As described in more detail below, at least one device of the network configuration 100 (such as an electronic device 101, 102, 104 or server 106) performs operations to predict and recommend personal and group activities or events using collaborative filtering. In some embodiments, the recommendations are based on sound, natural language processing (NLP), and/or automatic content recognition (ACR). Some embodiments may deploy unique models for group activity and event learning, tagging, and recommendation based on polyphonic sounds detected at home and related interests of users.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
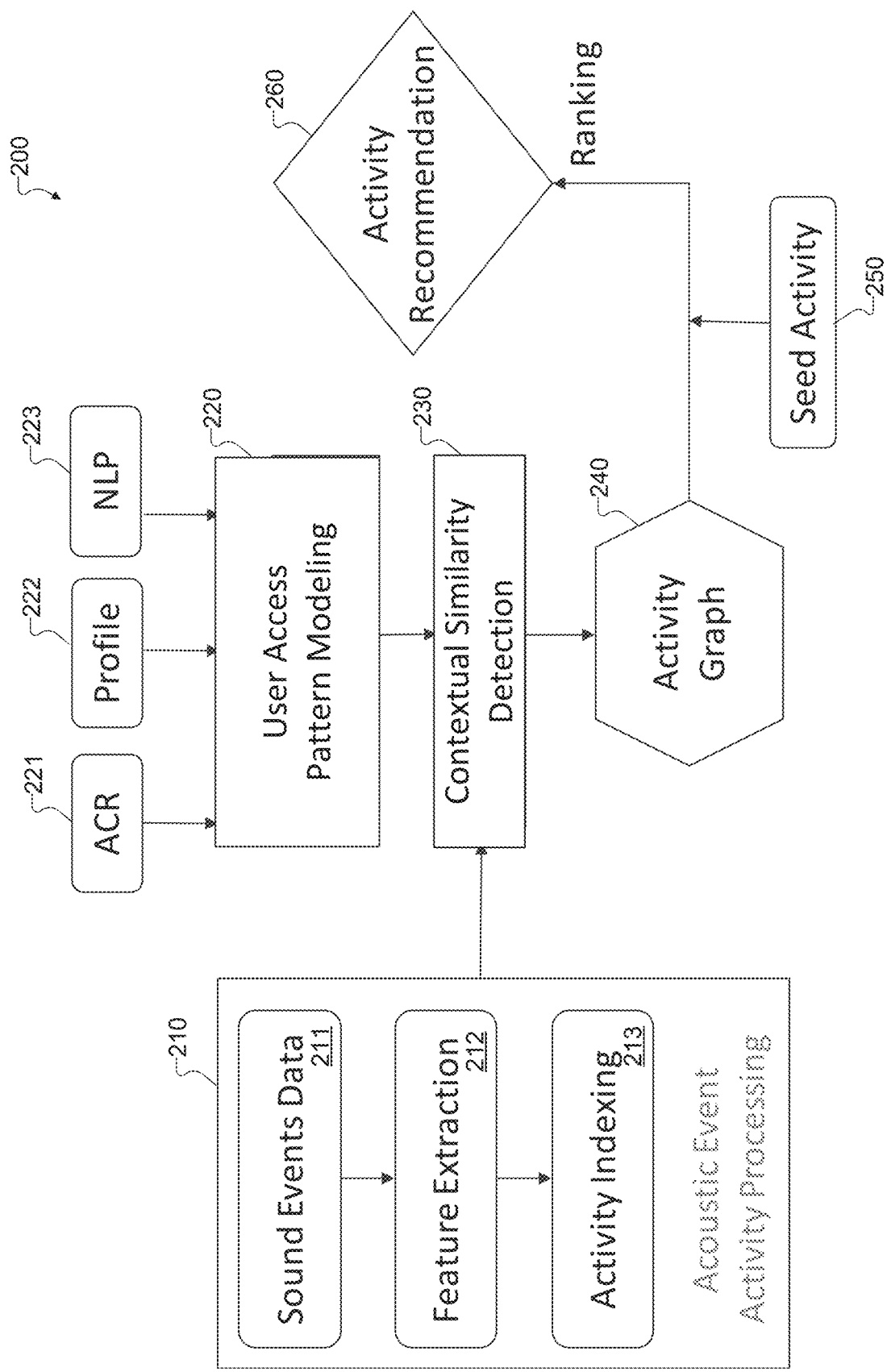
FIG. 2 illustrates an example process for predicting user interests and recommending personal and group activities in accordance with this disclosure.
Figure 3:
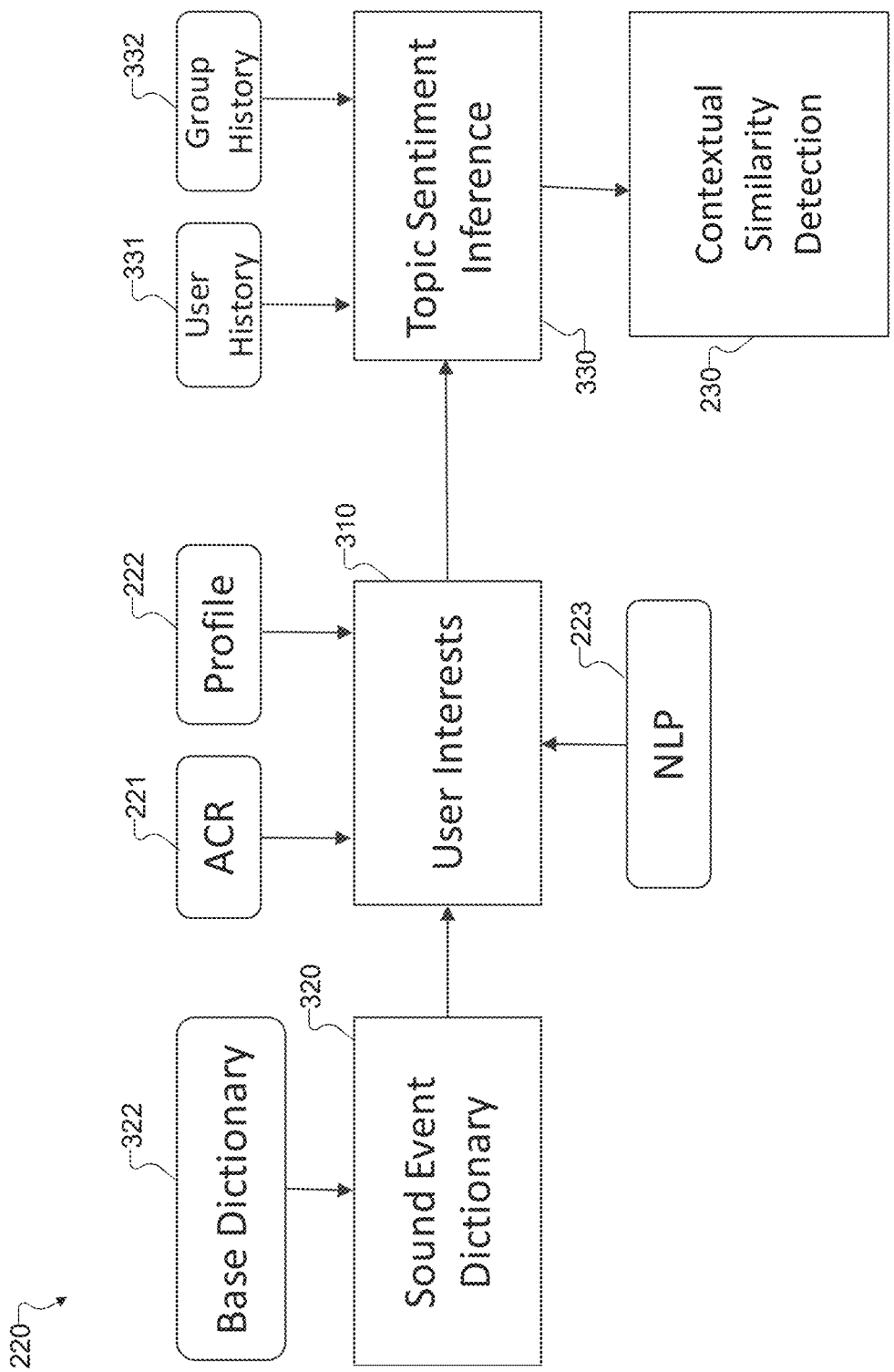
FIG. 3 illustrates the user access pattern modeling function of FIG. 2 in greater detail.
Figure 4:
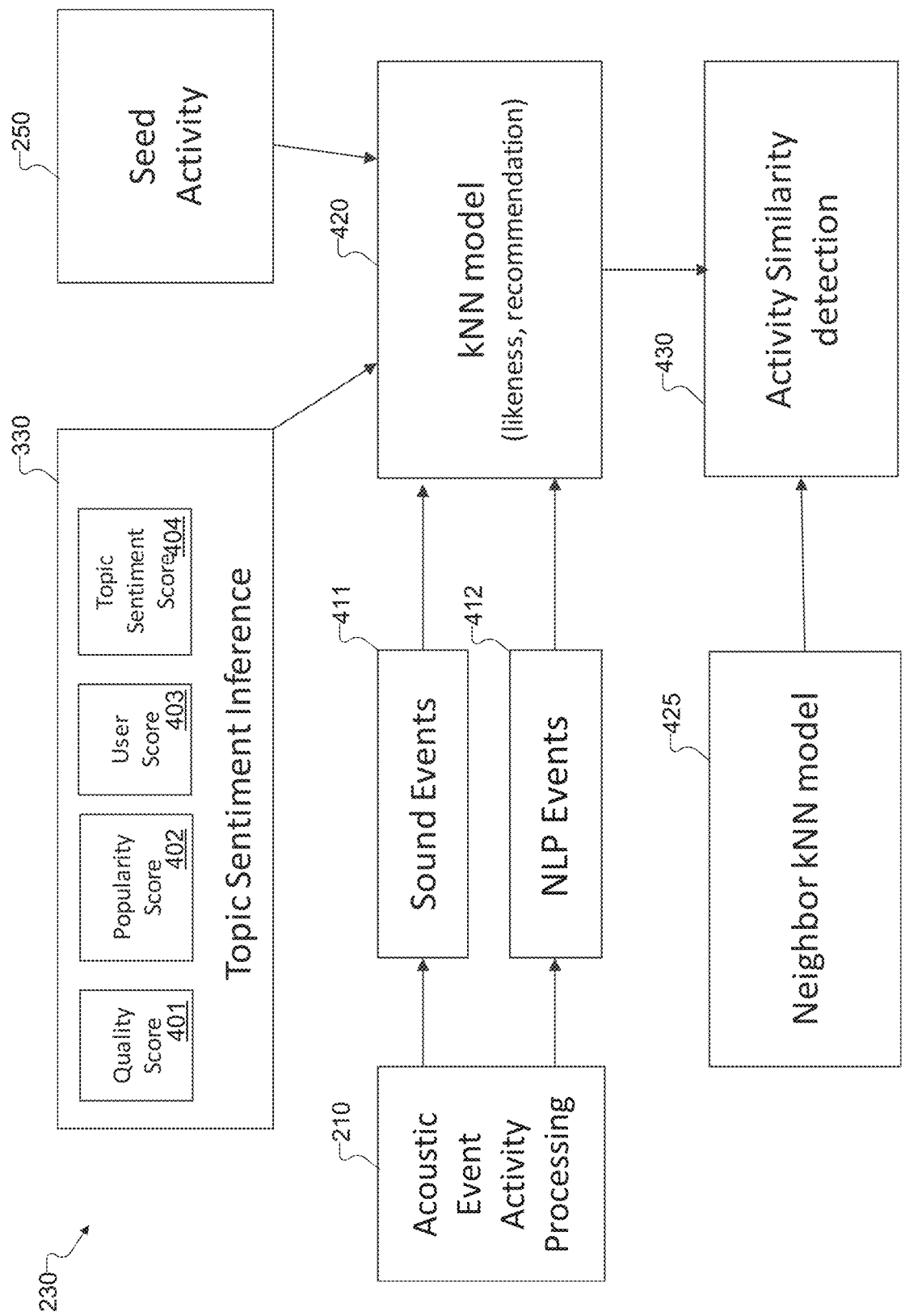
FIG. 4 illustrates the contextual similarity detection function of FIG. 2 in greater detail.

FIG. 2 illustrates an example process 200 for predicting user interests and recommending personal and group activities in accordance with this disclosure. For ease of explanation, the process 200 shown in FIG. 2 may be described as being performed by one of the devices shown in FIG. 1, such as the electronic device 101 or the server 106. However, the process 200 may be performed using any other suitable device or system. FIGS. 3 and 4 provide additional details for certain operations of the process 200 for greater understanding.

As shown in FIG. 2, the electronic device 101 receives sound event data 211 from one or more sources (e.g., a microphone of the electronic device 101, another electronic device, etc.) and performs acoustic event activity processing 210 using the sound event data 211 to obtain acoustic event data. The sound event data may be collected during an activity in which one or more individuals in a group are participating. The activity can be referred to as a seed activity 250. Examples of a seed activity 250 can include (but are not limited to) people listening to a song played on the radio, people watching a ballgame or movie on television, and the like. Typically, there is recorded audio, video, or both associated with the seed activity 250.

The acoustic event activity processing 210 can include feature extraction 212, which can include parsing the sound event data 211 to filter out noise and extract one or more particular sounds. The acoustic event activity processing 210 can also include activity indexing 213, which classifies each particular sound into a sound class, such as a dog bark, a phone ringing, or a game being played. The electronic device 101 can use any suitable technique(s) to perform the acoustic event activity processing 210. For example, the electronic device 101 can use a convolutional neural network (CNN) for the acoustic event activity processing 210.

As used herein, sound classification refers to organizing sounds into different groups or classes based on shared characteristics or parameters of the sounds. Sound classes can be specific (such as a clap class or a dog bark class), less specific (such as a male voice class, a female voice class, and an animal sound class), or even more general (such as human voice class and inanimate object sound class). Classification can also take into account volume and pitch for verbal sounds, which can indicate a level of excitement or emotion. For example, a spoken "home run" might indicate a lower level of engagement than a yelled "home run!" and thus may be included in a different class.

In addition to performing acoustic event activity processing 210, the electronic device 101 also performs a user access pattern modeling function 220 using other sound and profile information, including ACR 221, user profile information 222, and NLP 223. FIG. 3 illustrates the user access pattern modeling function 220 in greater detail.

As shown in FIG. 3, the electronic device 101 performs ACR 221, or receives ACR information from one or more other electronic devices, to determine activities that are occurring in a space. For example, the electronic device 101 can use ACR 221 to determine that a baseball game is currently being shown on a television in a family room. More specifically, the ACR 221 can indicate what teams are playing, how long the game has been on, and the like.

The electronic device 101 also obtains user profile information 222 for one or more users that may be associated with an activity. The user profile information 222 includes information about a user, such as the user's interests, hobbies, or demographic information (e.g., age, gender, marital status, and the like). The user profile information 222 can be input by the user at an earlier time (e.g., during a setup or initialization process), received from another device or application that already has user profile information for one or more users, or determined over time as the electronic device 101 learns more information about each user.

The electronic device 101 also uses NLP 223 to detect and interpret spoken language that occurs in or near the space where the activity (or activities) are occurring. As known in the art, NLP can be used to parse the words, volume, and tone of the spoken language to determine or estimate demographic information about the speaker (e.g., age, gender, etc.), the emotional state of the speaker (e.g., happy, angry, excited, bored, etc.), and the actual message that is spoken. This information can provide context for any detected activities.

The electronic device 101 uses collaborative filtering to determine user interest information 310 and generate topic sentiment inferences 330 from the ACR 221, user profile information 222, and the NLP 223. The user interest information 310 reflects a current level of interest of a particular user for a current activity, such as a level of a user's interest and engagement in a particular ballgame currently shown on a television. The electronic device 101 can also use information from one or more sound event dictionaries 320 and one or more base dictionaries 322 to determine the user interest information 310.

The sound event dictionary 320 maps sound data, which may be associated with a person (e.g., a clap, a whistle, and the like), to a particular class. For example, the sound event dictionary 320 can associate the particular acoustic information of a clap with the "clap" class. The base dictionary 322 includes predetermined sound-based "opinions" for one or more common activities. For example, a sports-related base dictionary 322 can include data items such as "Yay!" for a baseball home run. The base dictionary 322 can also indicate user sentiment for each sound. For example, a cheer sound in the sports-related base dictionary 322 could be associated with a high level of user interest or engagement in an activity, while a yawn sound could be associated with a low level of user interest in the activity. The information in the dictionaries 320-322 provide additional information sets for the electronic device 101 to determine the user interest information 310.

Taking the user interest information 310, the electronic device 101 uses collaborative filtering to determine one or more topic sentiment inferences 330. The topic sentiment inferences 330 are then used as input to the contextual similarity detection function 230, as described in greater detail below. Here, collaborative filtering refers to the process of filtering information from multiple data sources (i.e., the user interest information 310, user history information 331, and group history information 332) to detect patterns associated with one or more users, and then using the patterns to make predictions about the interests of the users, which include the topic sentiment inferences 330.

Each topic sentiment inference 330 is an estimate of whether an activity is liked by the user based on the content played and features derived from words spoken during the activity, user features obtained from the user profile information 222, the user history information 331 (which includes previous activity and interest information obtained over time for the specific user), and the group history information 332 (which includes pattern based history of other users in the group (e.g., other family members) over time). For example, a topic sentiment inference 330 can include a user's current level of interest in a baseball game playing right now. A topic sentiment inference 330 can also include the user's historical level of interest in the sport of baseball in general (e.g., according to the user listing baseball as a hobby in the user profile information 222), in watching baseball games in general (e.g., according to how many times the ACR 221 has detected a baseball game being shown in the home in the past weeks, months, or years), or in watching the particular teams that are currently playing.

In some embodiments, a topic sentiment inference 330 can also include how a user has reacted to previous recommendations offered to the user. For example, if there have been previous recommendations to purchase tickets to a local baseball game, and the user has always declined those recommendations, it can be concluded that the user enjoys watching baseball games on television but does not want to attend the games in person. The electronic device 101 can use any suitable topic sentiment analysis modeling techniques to determine the topic sentiment inferences 330.

Turning again to FIG. 2, the electronic device 101 takes the information obtained during the acoustic event activity processing 210 and the user access pattern modeling function 220 and provides the information as input to perform the contextual similarity detection function 230. The electronic device 101 performs the contextual similarity detection function 230 to determine activities that are similar to the seed activity 250 and may be recommended to the users. FIG. 4 illustrates the contextual similarity detection function 230 in greater detail.

As shown in FIG. 4, the topic sentiment inferences 330 can include one or more scores, such as a quality score 401, a popularity score 402, a user score 403, and a topic sentiment score 404. The quality score 401 can indicate a confidence level in the accuracy of the topic sentiment inference 330. The popularity score 402 assigns a level of popularity to an activity with the group of users. The user score 403 can represent a particular user's interest in the activity. The topic sentiment score 404 can indicate a sentiment by one or more users for the activity, such as like, dislike, strong dislike, etc.

The acoustic events determined during acoustic event activity processing 210 can be classified into sound events 411 and NLP events 412. Each event 411-412 can be represented as a vector in a multi-dimensional space. The distance between the representation vectors characterizes and quantifies the relationships between activities of interest among different members of the group. Using a Minkowski distance function leads to a subjective model without taking into account the specific features of individual users. When performing the contextual similarity detection function 230, the electronic device 101 takes into account different perceptions of the group(s) of users and access patterns for the specific group of users using a weighted Minkowski distance function with a static weighting scheme. For example, using this method, the electronic device 101 can predict that high engagement is related to, e.g., a cheering sound or other noisy responses on completion of an activity, or predict that silence or mobile tapping noises mean low engagement with the specific activity. In some embodiments, the electronic device 101 filters out neutral events, since the neutral events do not typically indicate a level of engagement or interest.

When performing the contextual similarity detection function 230, the electronic device 101 determines predictive weights of different activity specific acoustic events among the events 411-412. The predictive weights may be assigned to one or more probable events that are envisioned with a high likelihood for the seed activity 250. The electronic device 101 can predict a base average rating for the seed activity 250 based on previous user access patterns and base patterns for the user group and subsequently enhance the engagement weights for that specific user towards the seed activity 250. This can be further enhanced using seed weights provided for the seed activity 250 and user segment towards the new baseline.

In some embodiments, the electronic device 101 perform such analysis and recommendations as follows. The electronic device 101 can classify user groups in one or more segments, and assign each event 411-412 a probability that the event 411-412 belongs to the seed activity 250. In some embodiments, the probability can be expressed as:

$$P[I_n] = \frac{1}{\sum_{i=1}^{n}(W_n - W_{n+1})}[w_n P_n P_{n+1}^{W_{n+1}/W_n} - w_{n+1} P_{n+1} P_n^{W_n/W_{n+1}}]$$

where $w_n$ is the weight of event n, $P_n$ is the probability of event n, and $P[I_n]$ is the probability of event n belonging to activity I. For the seed activity 250, the acoustic events 411-412 are independent and Gaussian, and the electronic device 101 can determine the probability using a known probability algorithm, such as Naïve Bayes assumption. Other probability algorithms may be utilized, including but not limited to graph Laplacian matrix algorithms, weighted Minkowski distance functions, and collaborative filtering using one or more kNN (k nearest neighbors) models.

The electronic device 101 uses metric learning approaches to determine similarity metrics based on the correlation between activity specific acoustic events and activity patterns, along with preferences of individual users based on their user category over a min-wise hash indexing scheme. Using the hashing scheme, the electronic device 101 applies the set of t independent hash functions to each component of the user access pattern vector of dimension n and chooses the minimum of 't' values as the recommended hash value. The electronic device 101 then compares similarity across the minimum hash value distance. The electronic device 101 then calculates the similarity based on each representation and combines the two similarity measurements linearly.

The electronic device 101 develops a set of ratings for the seed activity 250. The ratings are used as input to a kNN model 420. The set of ratings for the seed activity 250 can be expressed as a ratings matrix R(U,I), where U represents a user group, I represents an activity group, and R(U,I) indicates the user group U's preference for an activity group I. In some embodiments, the ratings matrix R may be assumed to be a reflection of the user preference matrix Ω where $r_{u,i} = \Omega_{u,I}$. where u represents the user and i represents the activity.

Using the kNN model 420, the electronic device 101 performs the activity similarity detection function 430 to predict one or more activities that are similar to the seed activity 250 and may be of interest to the users of the group. In some embodiments, users may be represented as |I|-dimensional vectors, and the electronic device 101 can measure similarity by the cosine distance between two rating vectors. In some embodiments, this can be computed efficiently by taking their dot product and dividing it by the product of their L2 (Euclidean) norms. The electronic device 101 can estimate the affinity of a particular user for a particular activity based on one or more acoustic event sets through a similarity detection algorithm, such as an algorithm using Pearson Correlation, as known in the art. Of course, this is merely one example, and any suitable similarity detection algorithm can be used.

The prediction can be based on the previous history of the user u and other users like u whose past behavior is similar to the current user. The similarity function s:U×U→R can used to generate predictions. Using this approach, the prediction $P_{u,i}$ of an activity can be given as follows:

$$P_{u,i} = \bar{r_u} + \frac{P(I_n) * \sum \dot{U} \in NS(u, \dot{u})(r_{\dot{u},i} - \bar{r}_{\dot{u}})}{\sum \dot{u} \in N|S(u, \dot{u})|}$$

where N is the set of past users with similar behavior, S is the similarity matrix, and $r_{\dot{u},i}$ is the rating of user u towards activity i, u is the current event, and ù is the previous event.

According to an embodiment, the combined similarity measurement can more accurately reflect human engagement and interest than one based only on acoustic features. The approach to meld the collaborative relationship between ACR, NLP, and acoustic features provides robust estimation of similarity and engagement for a specific type of activity and their associated features. However, the electronic device 101 can adapt the model to user specific patterns, including category of the user, user profile, activities of interest, and the like. In some embodiments, the electronic device 101 can use edge-based adaptation for the specific class of users or user groups to estimate the appropriate weights.

In some embodiments, the electronic device 101 can accomplish the merging of interests by selecting a subset of users whose access patterns are similar to those of the active users and then use only those selected. The electronic device 101 can filter out disengaged users that are not a part of the activity and sound localization helps drive this goal.

As shown in FIG. 4, the activity similarity detection function 430 can be expanded to include multiple kNN models. For example, the electronic device 101 can use one or more neighbor kNN models 425 when the activity includes more than one group, such as two or more families participating in a multi-group or multi-family activity. In such a scenario, the kNN model 420 reflects the model for a first family, while the neighbor kNN model 425 reflects the model(s) for the other families. The neighbor kNN model 425 is optional and may be omitted when only one group or family is considered.

Turning again to FIG. 2, the electronic device 101 uses the information from the contextual similarity detection function 230 to generate an activity graph 240. The activity graph 240 represents a list of potential activities that could be proposed to one or more users of the group. Once the electronic device 101 generates the activity graph 240, the electronic device 101 can temporarily map the potential activities to the seed activity 250 to develop rankings, where the rankings are determined according to the level of interest that each user has demonstrated in the activity. For example, a high ranking activity is one in which most or all of the users in the group are interested. The electronic device 101 then makes one or more recommendations 260 of specific activities based on the rankings of the proposed activities. For example, the electronic device 101 may show (e.g., on the display of the electronic device) the one or two highest ranked activities in the activity graph 240 that are available or possible in the near future. The electronic device 101 can also provide recommendations for ancillary activities or services that might be needed or used with the proposed activity, such as transportation to a recommended baseball game. The electronic device 101 can use any suitable technique for activity recommendation, such as graph Laplacian and label propagation.

Although FIGS. 2 through 4 illustrate one example of a process 200 for predicting user interests and recommending personal and group activities, various changes may be made to FIGS. 2 through 4. For example, while certain operations in FIGS. 2 through 4 are shown as occurring in a particular order, various operations could overlap or occur in parallel. Also, various operations could occur in a different order or occur any number of times.

Figure 5:
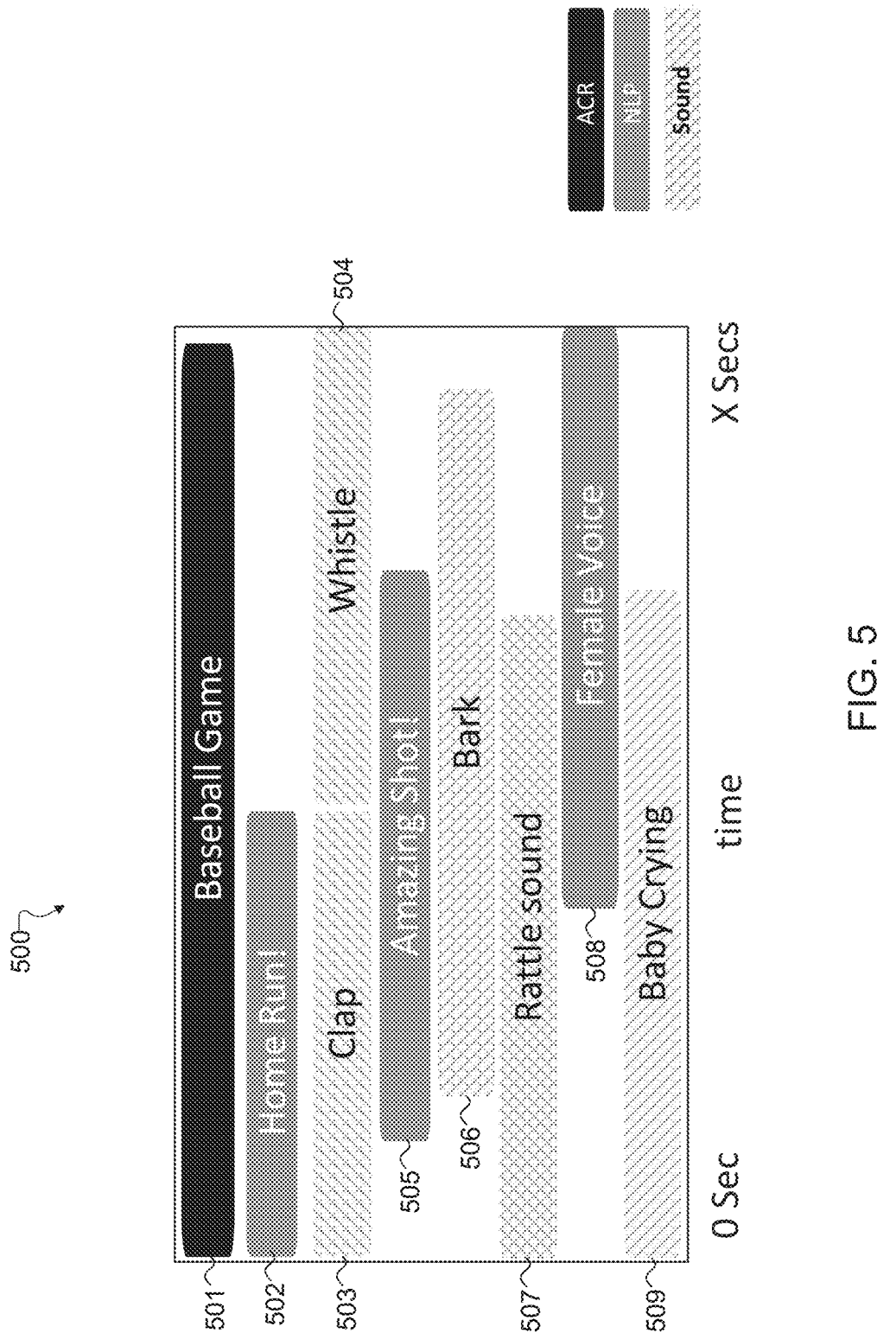
FIG. 5 illustrates an example group activity in which at least some portions of the process of FIG. 2 are implemented, in accordance with this disclosure.

FIG. 5 illustrates an example group activity 500 in which at least some portions of the process 200 are implemented, in accordance with this disclosure. In this scenario, the group activity 500 involves a family watching a baseball game on television. For ease of explanation, the group activity 500 is described as involving the electronic device 101. Of course, this is merely one example, and the group activity 500 could involve any suitable device or system.

In the group activity 500, the family watching the baseball game can represent the seed activity 250. As shown in FIG. 5, the electronic device 101 detects acoustic events 501-509 that occur during the group activity 500. The acoustic events 501-509 occur over time, from 0 to X seconds, and at different times, as indicated by the time-based chart of FIG. 5.

Using the sound processing techniques described in the process 200, including NLP and ACR, the electronic device 101 analyzes and identifies the acoustic events 501-509. For example, the electronic device 101 can use ACR techniques to determine that the baseball game is being shown on the television (acoustic event 501). The electronic device 101 can use NLP to detect a voice saying "Home Run!" (acoustic event 502) or "Amazing Shot!" (acoustic event 505). The electronic device 101 can also use NLP to detect words from a female voice (acoustic event 508). The electronic device 101 can also detect other, non-verbal sounds, including one or more claps (acoustic event 503), whistles (acoustic event 504), barks (acoustic event 506), baby rattle sounds (acoustic event 507), and baby crying sounds (acoustic event 509). These acoustic events can be processed and classified in accordance with the process 200.

Figure 6:
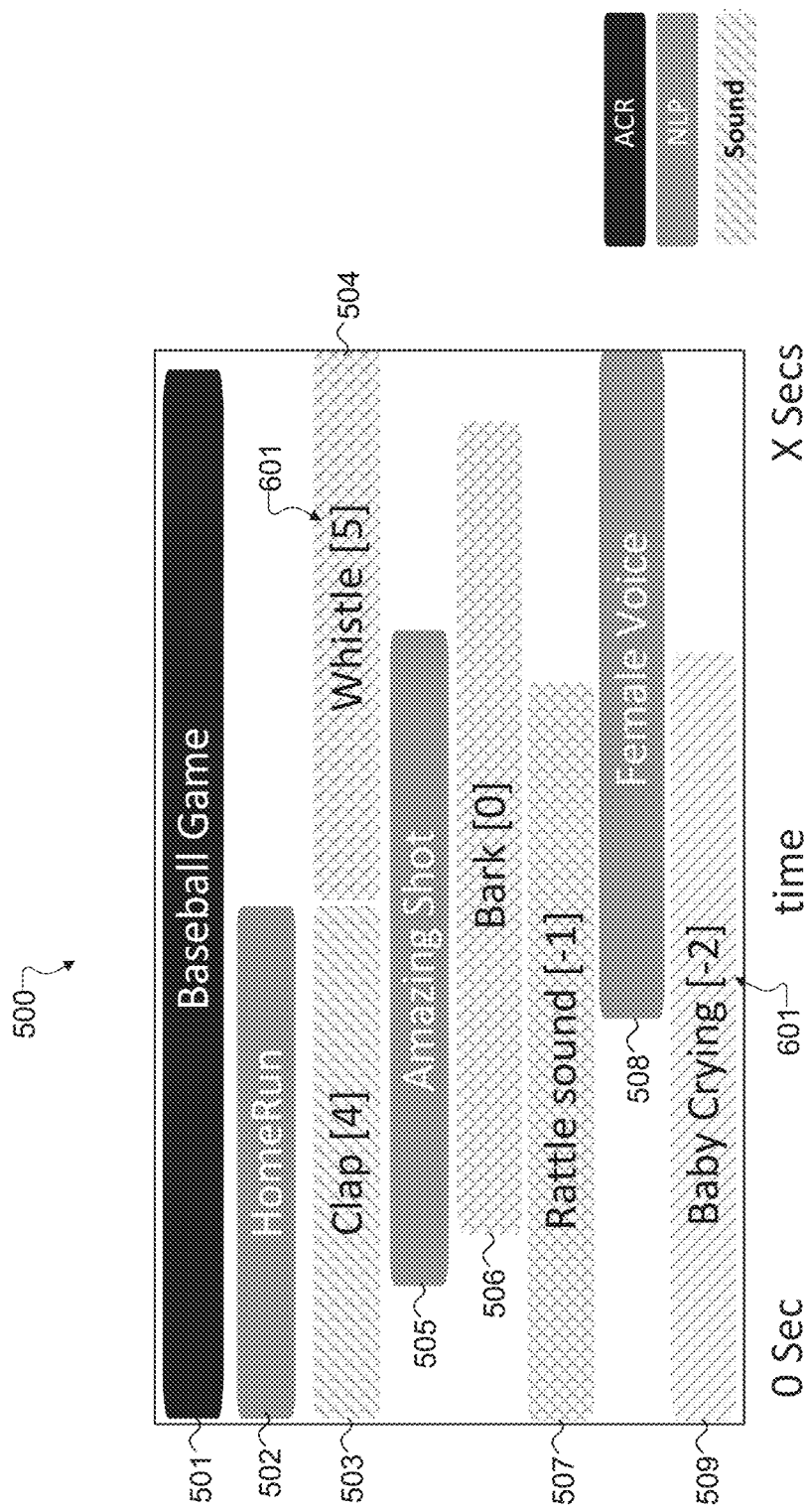
FIG. 6 illustrates ratings for acoustic events for the group activity of FIG. 5 in accordance with this disclosure.

For example, in one aspect of operation, the electronic device 101 can assign ratings to each acoustic event 501-509. FIG. 6 illustrates ratings 601 that have been assigned to some of the acoustic events 501-509 shown in FIG. 5. In some embodiments, the acoustic events 501-509 can be rated on a scale of −5 to 5 based on their intensity and relevance to the activity through a CNN. The electronic device 101 can assign unknown events (e.g., events that are not known in the initial model), such as the bark, a ratio of 0.

Following the processing and classifying of the acoustic events 501-509, the electronic device 101 can determine one or more of the following about the family:

Father: actively engaged in watching the baseball game.

2 children: actively engaged in watching the baseball game.

Mother: not actively engaged in watching the baseball game.

Presence of an infant and a pet dog in the space where the game is being watched.

Using the data, the electronic device 101 can determine that at least most of family enjoys baseball games because they are actively engaged in a televised baseball game. Using this information, the electronic device 101 can perform the following actions:

Determine that a professional baseball game is scheduled in the area in the near future, and recommend the purchase of game tickets for the family.

Recommend a ride sharing service for the family to get to the game location.

Recommend a nanny or babysitter for the infant and a care taker for the dog.

All of the recommendations are provided together so that a family can easily make all plans at one time for a family activity.

Figure 7:
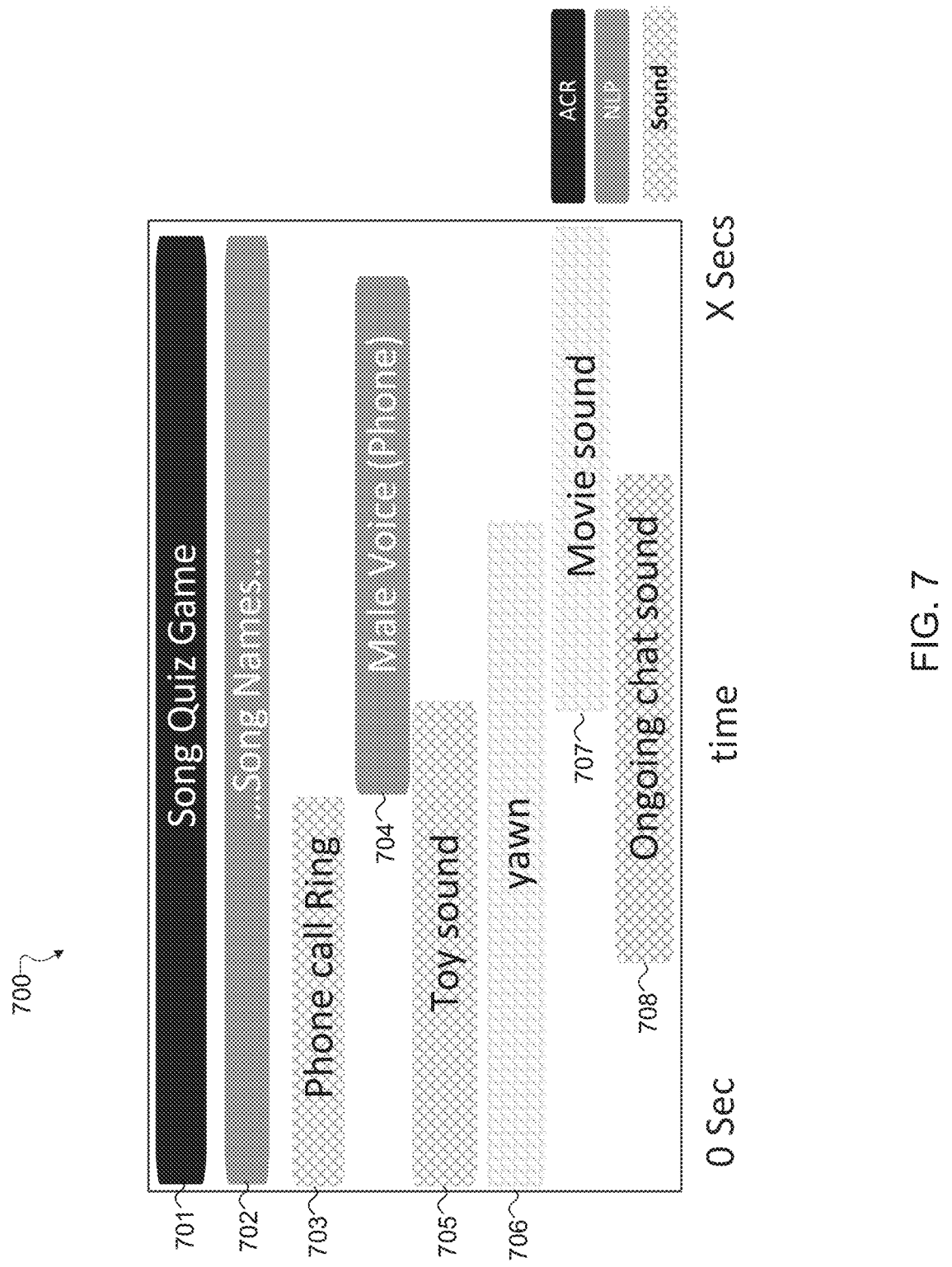
FIG. 7 illustrates another example group activity in which at least some portions of the process of FIG. 2 are implemented, in accordance with this disclosure.

FIG. 7 illustrates another example group activity 700 in which at least some portions of the process 200 are implemented, in accordance with this disclosure. In this scenario, the group activity 700 is a multi-group activity in which multiple families play a game, such as SONG QUIZ. In the group activity, each family can play in their own home using an IoT (Internet-of-Things) smart speaker, which can provide interaction with an intelligent assistant. For ease of explanation, the group activity 700 is described as involving the electronic device 101. Of course, this is merely one example, and the group activity 700 could involve any suitable device or system.

In the group activity 700, the game played by the families can represent the seed activity 250. As shown in FIG. 7, the electronic device 101 (which could include, for example, the smart speaker in one home) detects acoustic events 701-708 of one family that occur during the group activity 700. The acoustic events 701-708 occur over time and at different times, as indicated by the time-based chart of FIG. 7.

Using the sound processing techniques described in the process 200, the electronic device 101 analyzes and identifies the acoustic events 701-708 for one family. For example, the electronic device 101 can use ACR techniques to determine that the song quiz game is being played (acoustic event 701). The electronic device 101 can use NLP to detect one or more voices saying different song names (acoustic event 702). The electronic device 101 can also use NLP to detect words from a male voice on a phone call (acoustic event 704). The electronic device 101 can also detect other, non-verbal sounds, including a phone call ring (acoustic event 703), the sound of toy being played (acoustic event 705), a yawn (acoustic event 706), sounds from a movie in the background (acoustic event 707), and one or more ongoing chat sounds that may not be distinguishable using NLP (acoustic event 708). These acoustic events can be processed and classified in accordance with the process 200 to determine one or more of the following about the family:

Father: not engaged in the game because he was on a phone call while the game was occurring.

1 child: playing with a toy and/or watching a movie.

Mother: semi-engaged the game, but also chatting.

Using the data, the electronic device 101 can determine that this family is not very engaged in the song quiz activity (even though the other families may be engaged in the activity). Thus, the electronic device 101 can recommend a different activity for this family in the future, such as a baking class. Since some members of the family may be interested in the baking class, the electronic device 101 can also recommend a grocery shopping service (for supplies for the baking class), a recipe book, and a movie for kids in the family that do not enjoy cooking.

Figure 8:
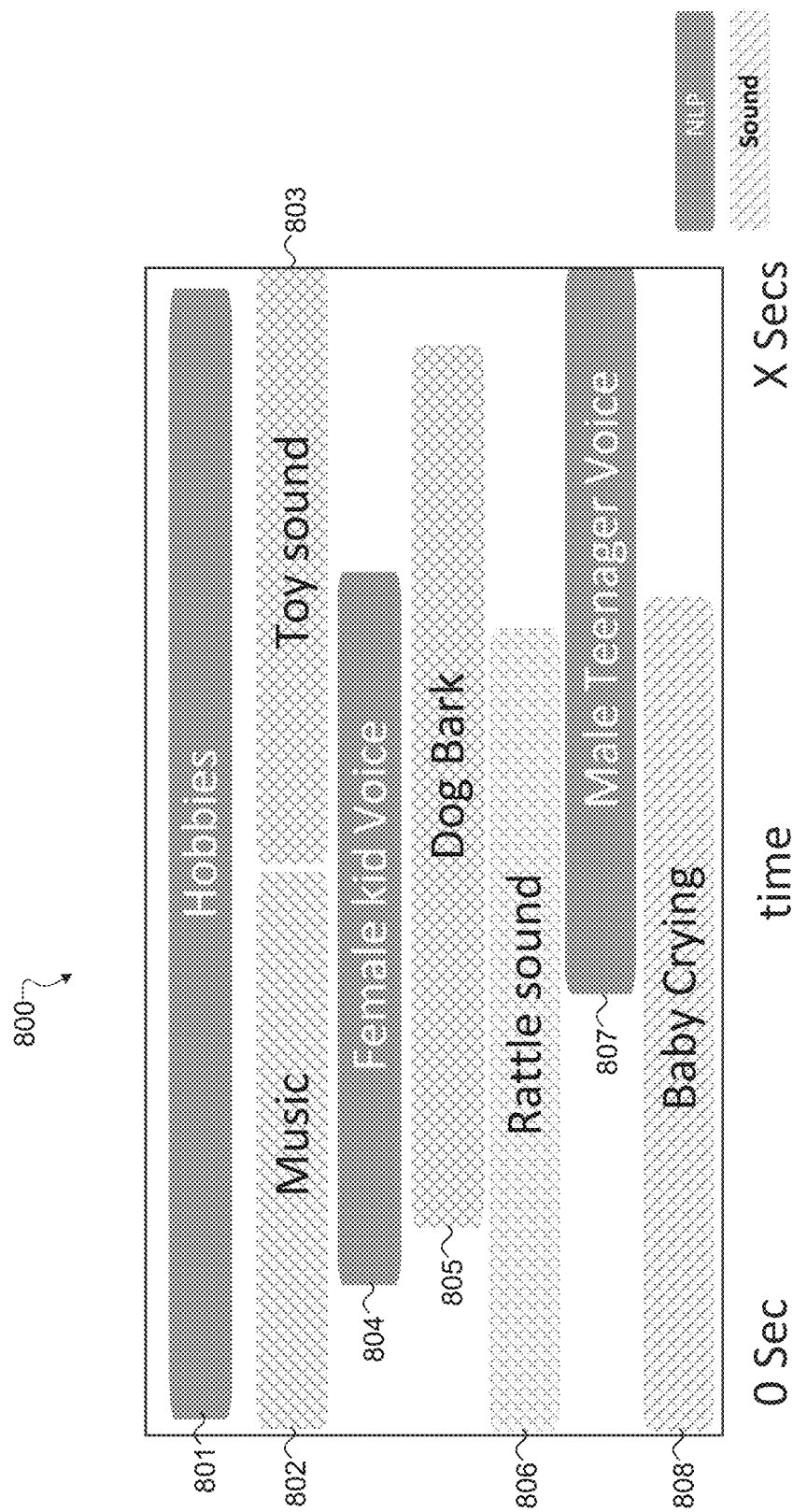
FIG. 8 illustrates an example activity set in which at least some portions of the process of FIG. 2 can be implemented for advanced contextual advertisement, in accordance with this disclosure.

FIG. 8 illustrates an example activity set 800 in which at least some portions of the process 200 can be implemented for advanced contextual advertisement, in accordance with this disclosure. In this scenario, the activity set 800 involves a family that is engaged in different activities during a time period. For ease of explanation, the activity set 800 is described as involving the electronic device 101. Of course, this is merely one example, and the activity set 800 could involve any suitable device or system.

In the activity set 800, there is no single seed activity, since the members of the family are engaged in different activities. As shown in FIG. 8, the electronic device 101 (which can include, for example, a smart speaker or another device capable of detecting and processing audio) detects multiple acoustic events 801-808 of the family, including hobbies, music, and the like. The acoustic events 801-808 occur over time and at different times, as indicated by the time-based chart of FIG. 8.

Using the sound processing techniques described in the process 200, the electronic device 101 analyzes and identifies the acoustic events 801-808. For example, the electronic device 101 can use NLP to detect a voice saying words related to one or more hobbies (acoustic event 801), a female child voice (acoustic event 804), and a male teenager voice (acoustic event 807). The electronic device 101 can also detect other, non-verbal sounds, including music (acoustic event 802), sounds from a toy (acoustic event 803), a dog bark (acoustic event 805), baby rattle sounds (acoustic event 806), and baby crying sounds (acoustic event 808). These acoustic events can be processed and classified in accordance with the process 200.

Information from the acoustic events 801-808 can be used for targeted advertisements that are more relevant and specific than advertisements determined using only NLP-derived information. For example, the electronic device 101 may be able to understand the dog bark sounds and use this information in conjunction with other NLP data to promote relevant product advertisements and services related to the dog. As another example, the electronic device 101 may be able to interpret different toy sounds and baby voices or cries along with other NLP data. The electronic device 101 can use this information to determine the presence of children and their ages, different type of toys being used, and the like. With this information, the electronic device 101 can promote more relevant toy advertisements, as well as other age appropriate supplies for the kids.

As a particular example, based on the acoustic events 801-808, the electronic device 101 may determine that the family includes an adult male, an adult female, two children (a male teenager and a young female child), an infant, and a pet dog that are present in the home. The electronic device 101 can generate or transmit the following targeted advertisements for different family members, as follows:

For the male teenager: Ads for the purchase of movies, books, and the like.

For the young female child: Ads for age appropriate school supplies.

For the adult female: Ads for baby products (e.g., baby care products, nanny services, infant toys, and the like).

For the adult male and female: Ads based on their hobbies or interests, and ads for products or services related to the dog.

Figure 9:
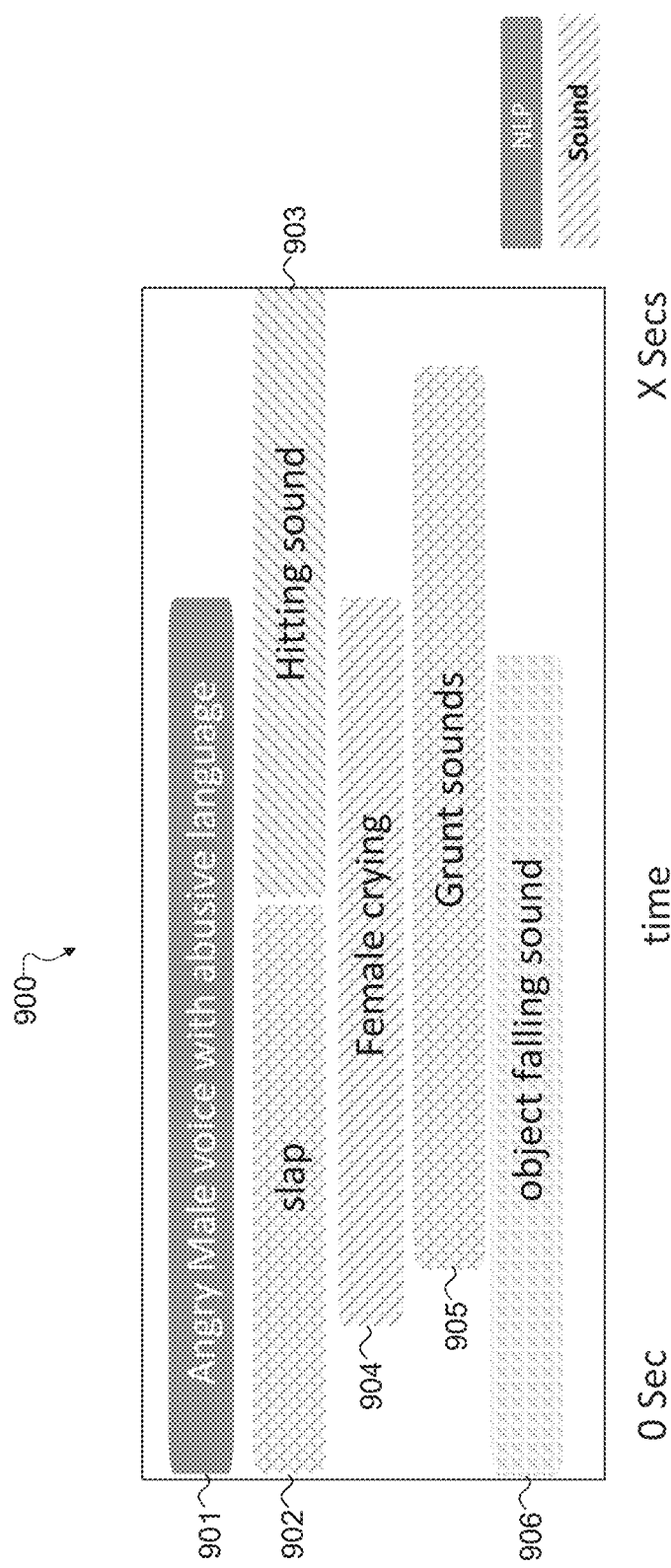
FIGS. 9 and 10 illustrate examples of scenarios in which at least some portions of the process of FIG. 2 can be implemented to assist in providing emergency services, in accordance with this disclosure.
Figure 10:
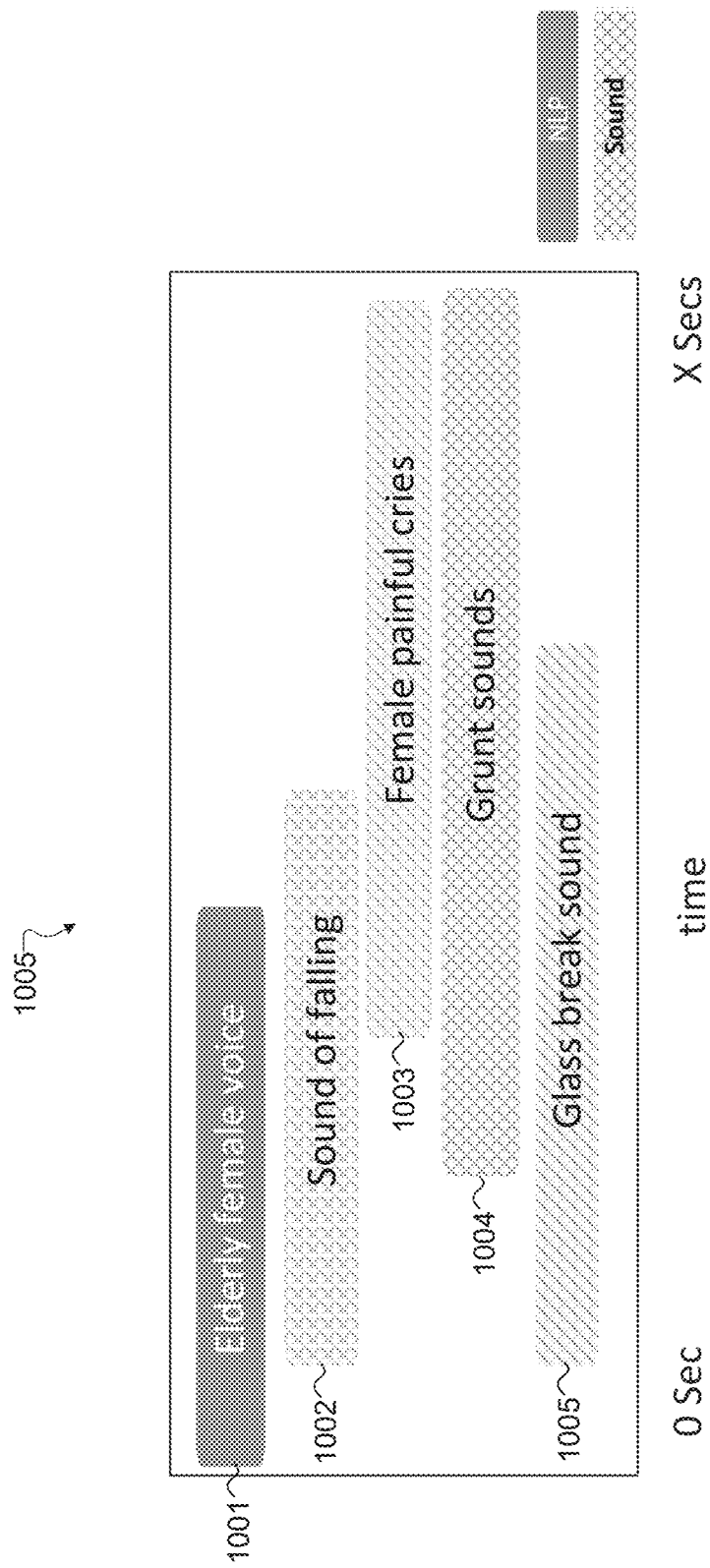

FIGS. 9 and 10 illustrate examples of scenarios 900, 1000 in which at least some portions of the process 200 can be implemented to assist in providing emergency services, in accordance with this disclosure. In the scenarios 900, 1000, an electronic device performing the process 200 can use polyphonic sounds to identify certain emergency situations in the home. For ease of explanation, the scenarios 900, 1000 are described as involving the electronic device 101. Of course, this is merely one example, and the scenarios 900, 1000 could involve any suitable device or system.

As shown in FIG. 9, in the scenario 900, the electronic device 101 detects multiple acoustic events 901-906 that occur inside the home. The acoustic events 901-906 occur over time and at different times, as indicated by the time-based chart of FIG. 9. Using the sound processing techniques described in the process 200, the electronic device 101 analyzes and identifies the acoustic events 901-906. For example, the electronic device 101 can use NLP to detect an angry male voice using abusive language (acoustic event 901). The electronic device 101 can also detect other, non-verbal sounds, including a slap (acoustic event 902), a hitting sound (acoustic event 903), a female crying (acoustic event 904), grunting sounds (acoustic event 905), or sounds associated with an object falling or being thrown (acoustic event 906). These acoustic events can be processed and classified in accordance with the process 200 to determine that an episode of violence may be occurring in the home. The electronic device 101 can then take one or more actions, including invoking emergency responders, to ensure the safety of the family.

As shown in FIG. 10, in the scenario 1000, the electronic device 101 detects multiple acoustic events 1001-1005 that occur inside the home. Using the sound processing techniques described in the process 200, the electronic device 101 analyzes and identifies the acoustic events 1001-1005. For example, the electronic device 101 can use NLP to detect words from an elderly female (acoustic event 1001). The electronic device 101 can also detect other, non-verbal sounds, including a falling sound (acoustic event 1002), cries of pain from a female voice (acoustic event 1003), grunting sounds (acoustic event 1004), or sounds of glass breaking (acoustic event 1005). These acoustic events can be processed and classified in accordance with the process 200 to determine that a medical emergency situation may be occurring in the home. The electronic device 101 can then take one or more actions, including invoking emergency responders or contacting other family members.

Figure 11:
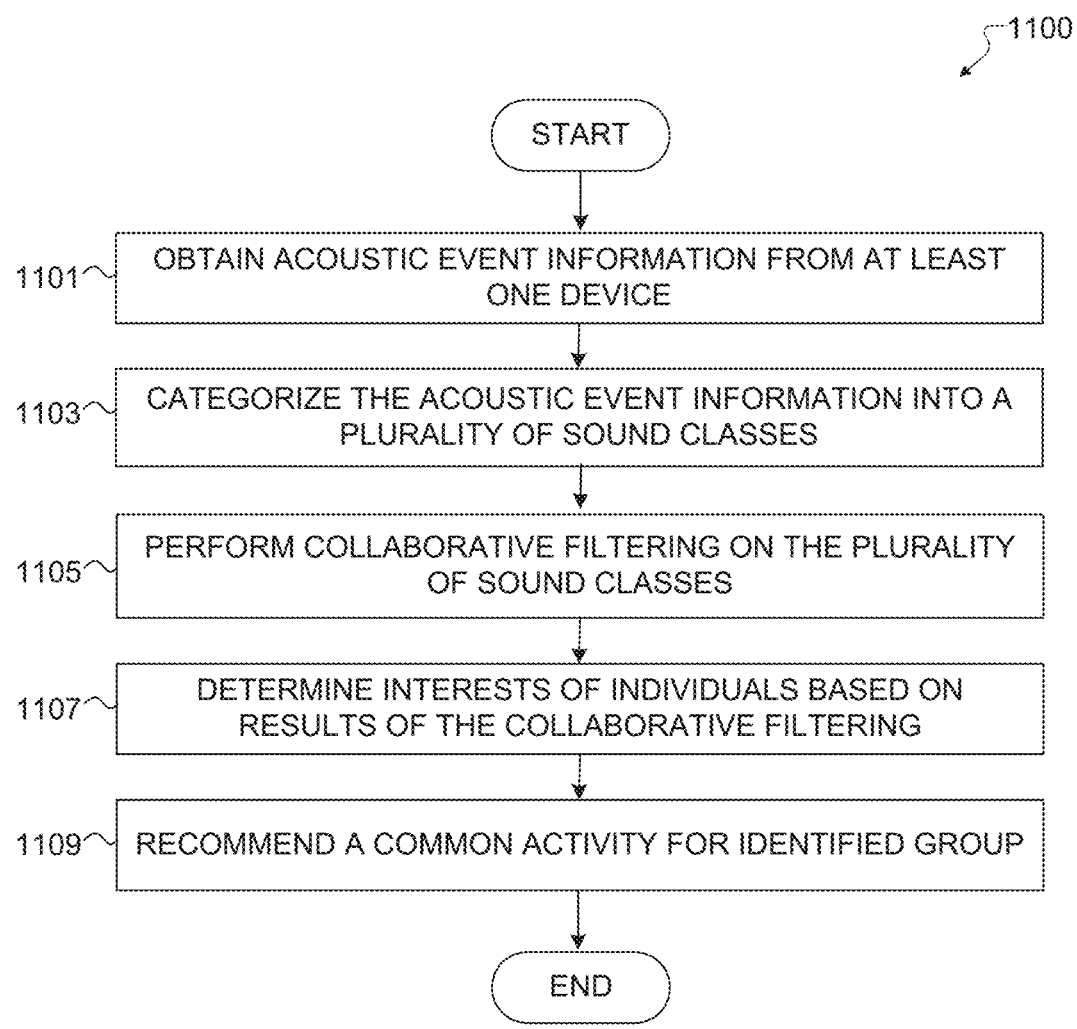
FIG. 11 illustrates an example method for predicting user interests and recommending personal and group activities in accordance with this disclosure.

FIG. 11 illustrates an example method 1100 for predicting user interests and recommending personal and group activities in accordance with this disclosure. For ease of explanation, the method 1100 is described as involving the performance of the process 200 shown in FIG. 2 using the electronic device 101 shown in FIG. 1. However, the method 1100 could be used with any other suitable electronic device and in any suitable system.

At step 1101, the electronic device 101 obtains acoustic event information from at least one device, where the acoustic event information associated with an activity. At least a portion of the acoustic event information is associated with sounds originating from multiple individuals in an identified group during a time period of the activity. This can include, for example, the electronic device 101 obtaining the sound event data 211 of FIG. 2. This can also include, for example, the electronic device 101 obtaining acoustic event information using ACR 221 or NLP 223.

At step 1103, the electronic device 101 categorizes the acoustic event information into a plurality of sound classes. This can include, for example, the electronic device 101 performing the acoustic event activity processing 210 of FIG. 2.

At step 1105, the electronic device 101 performs collaborative filtering on the plurality of sound classes. This can include, for example, the electronic device 101 performing the user access pattern modeling function 220, which uses collaborative filtering to determine one or more topic sentiment inferences 330.

At step 1107, the electronic device 101 determines one or more interests of the individuals in the identified group based on results of the collaborative filtering. This can include, for example, the electronic device 101 performing the user access pattern modeling function 220 to determine one or more topic sentiment inferences 330.

At step 1109, the electronic device 101 recommends a common activity for the identified group, based in part on the interests of the individuals in the identified group. This can include, for example, the electronic device 101 ranking activities in the activity graph 240 and making one or more recommendations 260.

Although FIG. 11 illustrates one example of a method 1100 for predicting user interests and recommending personal and group activities, various changes may be made to FIG. 11. For example, while shown as a series of steps, various steps in FIG. 11 could overlap, occur in parallel, occur in a different order, or occur any number of times.

The embodiments described above are not meant to be limiting and are merely illustrative of various aspects of this disclosure. While example embodiments may be indicated as applicable to a particular device category (such as mobile devices, servers, etc.), the processes and examples provided above are not intended to be solely limited to those device categories and can be broadly applicable to various device categories (such as appliances, computers, automobiles, smart speakers, IoT devices, etc.).

While the figures have been described and novel features as applied to various embodiments have been pointed out above, it will be understood that various omissions, substitutions, and changes in the form and details of the systems, devices, or processes described above may be made by those skilled in the art without departing from the scope of this disclosure. This description is in no way meant to be limiting but rather should be taken as illustrative of the general principles of this disclosure.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining acoustic event information from at least one device, the acoustic event information associated with a first activity, at least a portion of the acoustic event information associated with sounds originating from a plurality of individuals in an identified group during a time period of the first activity;
   categorizing the acoustic event information into a plurality of sound classes;
   performing collaborative filtering on the plurality of sound classes;
   determining one or more interests of the plurality of individuals in the identified group based on results of the collaborative filtering; and
   recommending a common activity for the identified group, based in part on the one or more interests of the plurality of individuals in the identified group.

2. The method of claim 1, wherein the acoustic event information is categorized into the plurality of sound classes using at least one of automatic content recognition and natural language understanding.

3. The method of claim 1, wherein performing collaborative filtering on the plurality of sound classes comprises:
   filtering information from the sound classes to detect patterns associated with the plurality of individuals; and
   making one or more predictions about the one or more interests of the individuals.

4. The method of claim 1, wherein the one or more interests of the plurality of individuals are determined according to a level of engagement of each individual in the first activity.

5. The method of claim 4, further comprising:
   determining the level of engagement of each individual using contextual similarity detection.

6. The method of claim 5, further comprising:
   performing the contextual similarity detection based on a user access pattern model.

7. The method of claim 5, wherein recommending the common activity for the identified group comprises:
   generating an activity graph based on the level of engagement of each individual;
   determining and ranking one or more potential activities including the common activity based on the activity graph and the first activity; and
   selecting the common activity from the one or more potential activities based in part on the ranking.

8. The method of claim 1, further comprising:
   obtaining second acoustic event information from at least one second device, the second acoustic event information associated with the first activity, at least a portion of the second acoustic event information associated with sounds originating from a plurality of individuals in a second identified group during the time period of the first activity;
   categorizing the second acoustic event information into a plurality of second sound classes;
   performing collaborative filtering on the second sound classes;
   determining one or more interests of the plurality of individuals in the second identified group; and
   recommending a common activity for the second identified group, based in part on the one or more interests of the plurality of individuals in the second identified group.

9. An electronic device comprising:
   a transceiver;
   a processor configured to:
      obtain, via the transceiver, acoustic event information from at least one other device, the acoustic event information associated with a first activity, at least a portion of the acoustic event information associated with sounds originating from a plurality of individuals in an identified group during a time period of the first activity;
      categorize the acoustic event information into a plurality of sound classes;
      perform collaborative filtering on the plurality of sound classes;
      determine one or more interests of the plurality of individuals in the identified group based on results of the collaborative filtering; and
      recommend a common activity for the identified group, based in part on the one or more interests of the plurality of individuals in the identified group.

10. The electronic device of claim 9, wherein the processor is further configured to categorize the acoustic event information into the plurality of sound classes using at least one of automatic content recognition and natural language understanding.

11. The electronic device of claim 9, wherein to perform collaborative filtering on the plurality of sound classes, the processor is configured to:
   filter information from the sound classes to detect patterns associated with the plurality of individuals; and
   make one or more predictions about the one or more interests of the individuals.

12. The electronic device of claim 9, wherein the processor is further configured to determine the one or more interests of the plurality of individuals according to a level of engagement of each individual in the first activity.

13. The electronic device of claim 12, wherein the processor is further configured to determine the level of engagement of each individual using contextual similarity detection.

14. The electronic device of claim 13, wherein the processor is further configured to perform the contextual similarity detection based on a user access pattern model.

15. The electronic device of claim 13, wherein, to recommend the common activity for the identified group, the processor is further configured to:
   generate an activity graph based on the level of engagement of each individual;
   determine and rank one or more potential activities including the common activity based on the activity graph and the first activity; and
   select the common activity from the one or more potential activities based in part on the ranking.

16. The electronic device of claim 9, wherein the processor is further configured to:
   obtain second acoustic event information from at least one second device, the second acoustic event information associated with the first activity, at least a portion of the second acoustic event information associated with sounds originating from a plurality of individuals in a second identified group during the time period of the first activity;

categorize the second acoustic event information into a plurality of second sound classes;

perform collaborative filtering on the second sound classes;

determine one or more interests of the plurality of individuals in the second identified group; and recommend a common activity for the second identified group, based in part on the one or more interests of the plurality of individuals in the second identified group.

17. A non-transitory computer readable medium containing computer readable program code that, when executed, causes at least one processor to:

obtain acoustic event information from at least one device, the acoustic event information associated with a first activity, at least a portion of the acoustic event information associated with sounds originating from a plurality of individuals in an identified group during a time period of the first activity;

categorize the acoustic event information into a plurality of sound classes;

perform collaborative filtering on the plurality of sound classes;

determine one or more interests of the plurality of individuals in the identified group based on results of the collaborative filtering; and recommend a common activity for the identified group, based in part on the one or more interests of the plurality of individuals in the identified group.

18. The non-transitory computer readable medium of claim 17, wherein the acoustic event information is categorized into the plurality of sound classes using at least one of automatic content recognition and natural language understanding.

19. The non-transitory computer readable medium of claim 17, wherein the computer readable program code that causes the at least one processor to perform collaborative filtering on the plurality of sound classes comprises computer readable program code that causes the at least one processor to:

filter information from the sound classes to detect patterns associated with the plurality of individuals; and make one or more predictions about the one or more interests of the individuals.

20. The non-transitory computer readable medium of claim 17, wherein the one or more interests of the plurality of individuals are determined according to a level of engagement of each individual in the first activity.

* * * * *